Patented Oct. 8, 1935

2,016,320

UNITED STATES PATENT OFFICE 2,016,320

DEHYDRATED FLOUR MIX AND PROCESS OF MAKING THE SAME

John D. Duff, Pittsburgh, and Louis E. Dietrich, Crafton, Pa., assignors to P. Duff & Sons, Inc., a corporation of Pennsylvania No Drawing. Application June 13, 1933, Serial No. 675,649

3 Claims. (Cl. 99—11)

Our present invention relates to a dehydrated mix or flour adapted to produce edible products by adding fluid and cooking or baking as well as to the process of making the same and more specifically to such a product and process which enables us to utilize fresh eggs therein, the present invention being a continuation in part of our copending applications Serial No. 501,468, filed Dec. 10, 1930 (now Patent No. 1,931,892), Serial No. 675,646, filed June 13, 1933 (now Patent No. 1,959,466), Serial No. 675,647, filed June 13, 1933 and Serial No. 675,648, filed June 13, 1933.

In our aforesaid copending applications and patents we have pointed out the defects and disadvantages hitherto accepted of necessity by the housewife in making such products as well as certain commercial disadvantages which we have overcome, such processes and products having a more or less psychological disadvantage in that they contain dried or powdered eggs which, while entirely satisfactory in many ways, are considered by some as inferior material. The housewife and the purchasing public in general seem to prefer fresh eggs and hence the use of dried or powdered eggs is somewhat of a handicap from a psychological standpoint.

We have found, however, that we can practice the processes of our copending applications and patents and produce the products made possible thereby without the use of dried or powdered eggs and such accordingly constitutes one of the objects of our present invention.

Another object of our invention includes the use of fresh eggs in making the products by means of the processes contemplated by our copending applications and patents.

Another object is to eliminate any psychological handicap involved in the use of dried or powdered eggs by so modifying our processes and products that the use of fresh eggs is made possible.

A still further object contemplates the improvement of the emulsion formed by the shortening and molasses due to the enhanced emulsifying effect of the albumen in the eggs.

An additional object of our invention lies in producing a dry mix containing fresh eggs in which the volatiles of the eggs are entrapped in a manner analogous to the entrapment of the molasses volatiles elsewhere stated.

Other objects and advantages will be understood by those skilled in this art or will be apparent or pointed out hereinafter.

In one preferred form of our present invention we substantially follow the process set forth in our above noted application Serial No. 501,468, filed December 19, 1930 (now Patent No. 1,931,892) although, as will be hereinafter pointed out, we may also use the present invention in connection with our other copending applications. Accordingly, we place molasses and shortening in the bowl of a dough mixing machine. This bowl is provided with means for heating the same which may, for example, consist of a steam coil inserted into the bowl or a suitable jacket around the bowl through which the steam or other heating medium may be passed. The bowl is also provided with suitable stirring or agitating means. Accordingly, the molasses and shortening are subjected to heat and agitation in the bowl and if we desire we may also add salt and sugar thereto, although these latter two ingredients may be omitted at this stage and added later with the other dry ingredients as will be understood from our copending applications. To such molasses and shortening, with or without the salt and sugar, we add fresh eggs either at the same time the shortening and molasses are put into the bowl or during the heating and agitation thereof. The albumen of the eggs aids in the emulsification and produces a better, more complete and more stable emulsion. At the same time the values in the eggs are fully utilized and there is no prior fixation or other conversion of the albumen or other egg constituents so as to represent an incomplete utilization of such eggs. The amount of fresh eggs added is such an amount as constitutes from about 5% to about 20% of the weight of the wet dough which is eventually formed after the flour has been added. A preferred amount of fresh eggs in the case of gingerbread is about 5% of the weight of the wet dough.

After the fresh eggs have been added and exerted their action on the shortening and molasses we then gradually add flour to the emulsion until a dough is formed in accordance with our aforesaid Patents 1,931,892 and 1,959,466 and our other applications. The dough formed is what we have termed a wet dough and considering the weight of the wet dough the fresh eggs constitute 5 to 20% thereof as above explained. The dough is, of course, suitably kneaded or the like and is then ready for drying.

We may dry the dough in a variety of ways. We may, for example, roll the dough into a relatively thin sheet which is dried by subjecting it to the influence of a blast of warm air, or we may divided the dough mechanically into relatively small pieces which may be placed on trays or dried in a suitably heated drying cabinet. We may, furthermore, force the dough through steel or other suitable dies to form thin strands, tubes or ribbons which may thereafter be readily dried in a suitable apparatus.

In addition we may suitably thin the dough with water or other fluid and spray dry the same to secure directly a dry powder.

We prefer to dry the dough, however, in what is known as a vacuum drier of the shelf type. This consists of an enclosed vacuum oven provided with shelves on which trays are adapted to be placed. The oven can be heated to the desired temperature by means of steam or other heating medium and the chamber within the oven is adapted to be subjected to a vacuum. We fill the dough to the desired depth in the trays and then place the trays on the shelves in the drier. After closing the door of the oven we so pass steam therearound so as to raise the temperature of the dough to about 160 to 170° F., which we term a mild heat, and which has no cooking or baking action on the glutinous or other characteristics of the flour or other materials in the oven. At the same time we subject the dough to a vacuum of 28 to 29 inches so that the dough is dried under mild heat and vacuum.

The drying is continued until the dough becomes a hard dry mass. This mass, due to its processing, is so constituted that the individual ingredients making up the same are unidentifiable as such. For this reason particularly we are convinced that processing has placed the ingredients so far added in a new physico-chemical relationship. This view is reinforced by the fact that the ultimate baked or cooked product has new and improved characteristics as to taste, texture, etc.

After the dough has been dried in any of the ways above stated, except where it has been spray dried, we then reduce the same to a suitable state of subdivision by grinding, pulverizing or the like.

In general, such state of subdivision should be relatively fine so that a free flowing product results and for this purpose we have found 20 mesh to be satisfactory, although we are, of course, not limited thereto.

The desired state of subdivision having been reached the mix is practically complete as all that we need then do is to intimately commingle the remaining dry ingredients with the dry powdered dough. This may be conveniently done by spreading the dry flour on a flat surface and sprinkling thereon the remaining dry ingredients which may then be all thoroughly mixed by raking or scooping operations. If we prefer we may place the dry powdered dough and the remaining dry ingredients in a suitable revolving mixing drum. The product secured is sold as a new article of commerce and is utilized by the purchaser by adding water or milk and then baking or cooking in the usual manner.

In making a gingerbread, for example, we make use of the ingredients set forth in our Patent 1,931,892 of October 24, 1933 with the exception that the powdered whole egg is eliminated and is replaced by fresh eggs as above described.

As already stated the percentage of fresh eggs for a gingerbread amounts to about 5% of the weight of the wet dough. The other ingredients are present in approximately the same proportions as set forth in our aforesaid patent.

In connection with the shortening used in the present invention we may make use of any of the shortenings set forth in our copending applications and patents and the same considerations are herein involved as are there set forth.

It is to be understood that the foregoing is intended in an illustrative sense rather than in a limitative sense. We contemplate variations in the percentages of the above ingredients depending upon the ultimate product desired. In addition, certain of the flavoring or seasoning ingredients may be omitted where they are not necessary or desired and other more suitable ingredients may be put in place thereof. For example, we can prepare by the present process a variety of types of flours from which can be made a number of different pastry products and these can be readily accomplished without departing from the spirit and scope of our present invention. We may, for example, make a brown bread flour by substituting brown bread flour for the wheat flour and varying the percentage of the shortening together with the omission of certain of the flavoring agents. Similarly, a spice cake or devil's food cake can be made by making appropriate changes as is understood by those versed in the baking art.

What we claim as new and desire to secure by Letters Patent is:

1. A process of making a dehydrated mix from which an edible product may be made by adding moisture and cooking or baking which includes the steps of making an emulsion of molasses, shortening and fresh eggs, adding flour to make a dough, drying the dough, grinding it to a suitable state of subdivision and commingling therewith predetermined dry ingredients to complete the mix.

2. A process of making a dehydrated mix from which an edible product may be made by adding moisture and cooking or baking which includes the steps of emulsifying molasses and shortening under heat and agitation, adding fresh eggs thereto under agitation and then adding flour to make a dough, drying the dough under mild heat and vacuum, grinding it to a suitable state of subdivision and commingling therewith predetermined dry ingredients to complete the mix in accordance with the ultimate desired nature thereof.

3. A process of making a dehydrated mix from which an edible product may be made by adding moisture and cooking or baking which includes the steps of emulsifying molasses and shortening under heat and agitation, adding fresh eggs thereto under agitation and then adding flour to make a dough, kneading the dough, drying the dough at about 160–170° F. and under a vacuum of about 28–29 inches, grinding it to a suitable state of subdivision and commingling therewith predetermined dry ingredients to complete the mix.

JOHN D. DUFF.
LOUIS E. DIETRICH.